Nov. 6, 1951  M. E. BIVENS  2,574,373
ELECTRIC VALVE CONTROL CIRCUIT
Filed July 22, 1946

Inventor:
Maurice E. Bivens,
by Claude A. Mott
His Attorney.

Patented Nov. 6, 1951

2,574,373

UNITED STATES PATENT OFFICE 2,574,373

ELECTRIC VALVE CONTROL CIRCUIT

Maurice E. Bivens, Schenectady, N. Y., assignor to General Electric Company, a corporation of New York Application July 22, 1946, Serial No. 685,330

20 Claims. (Cl. 250—27)

My invention relates to electric valve control circuits and particularly to electric valve control circuits for electric translating apparatus.

The use of electric valve control circuits for supplying accurately timed current impulses of predetermined magnitude from an alternating current source to a load through a suitable translating apparatus has become common practice, particularly in the resistance welding field. Many of these circuits include timing means for controlling the period of energization of the load circuit in which the parts to be welded are connected, as well as means for determining the instant in each half cycle of voltage at which the flow of load current is initiated during the period of energization to control the amount of current and consequently the amount of heat supplied to the weld. This heat control is obtained by adjusting or shifting the phase displacement of the control voltage of the electric valve means of the translating apparatus relative to the anode voltage of the electric valve means. When the translating apparatus embodies a saturable inductive device, such as a welding transformer, it is highly desirable to use synchronous timing, that is, to initiate the timing period at the same point in the voltage wave, and particularly at the power factor phase angle of the load circuit. Also to prevent saturation of the welding transformer, it is desirable to control its energization in full cycle steps. As will be pointed out in greater detail below, I provide an improved alternating current electric valve circuit which, when used as a resistance welding control, operates synchronously to time in full cycle steps the flow of welding current which is adjustable in magnitude by the phase shift method.

It is an object of my invention to provide a new and improved electric valve control circuit.

It is another object of my invention to provide a new and improved electric valve timing circuit.

It is also an object of my invention to provide an electric valve circuit in which the amount of current flowing during the period of energization is controlled by the phase shift method through the use of sine wave voltages in place of the usual peaked voltages heretofore employed.

Still another object of my invention is to use the substantially constant voltage drop of a gas valve connected in an inductive circuit for controlling the conduction of another valve in trailing response to the trailing voltage across the gas valve which results from conduction therethrough continuing over into the following negative half cycle of its anode voltage.

It is also an object of my invention to control the conduction of an electric valve means in accordance with the voltage derived from an oscillating circuit which is set in oscillation at the frequency of the supply circuit for a predetermined number of cycles.

It is also an object of my invention to provide for the electric valve means an initiating circuit of the phase shift type which is instantaneously responsive to the closure of a push button which is fully insulated from the voltage of the phase shift circuit.

Further objects of my invention will become apparent from a consideration of the following description of one embodiment thereof shown in the accompanying drawing.

In accordance with the illustrated embodiment of my invention, a pair of reversely connected electric power valves are connected between an alternating current supply circuit and a welding transformer to control the transfer of alternating current therethrough to the work to be welded which is connected in the load circuit. These power valves are controlled in response to sine wave control voltages which are selectively and automatically impressed on their control members so that the more negative voltage is at all times controlling. The amount of current supplied to the weld is controlled by adjusting the phase of a sine wave voltage connected in the control circuit of the power valves and this phase controlled voltage becomes effective or ineffective depending on a sine wave bias voltage also connected in the control circuit of the power valves. The period during which the bias voltage is ineffective, that is, the period of conduction of the power valves, is determined by a closed circuit which is set in oscillation at the frequency of the supply circuit by conduction of one electric control valve and abruptly brought to a nonoscillating state by the subsequent conduction of another electric control valve. These control valves are rendered conductive by the voltage drop across a gas valve which is connected in an inductive circuit so that these control valves become conductive during a negative half cycle following the operation of the gas valve. One of these control valves trails immediately and the other after a predetermined time delay imposed by a capacitor connected in its control circuit and charged through its control element to cathode circuit during negative half cycles of its anode voltage which occur when the gas valve is held nonconductive. This capacitor is provided with an adjustable discharge circuit in order to control the interval during which the second control valve is held nonconducting after the gas valve has been rendered conducting. Conduction of the gas valve is initiated at the beginning of a half cycle of positive anode voltage by a phase shift circuit which is operated by a push button which when closed short circuits the secondary winding of a control transformer whose primary is connected in the phase shift circuit employed for controlling the conduction of the gas valve.

Figure 1:
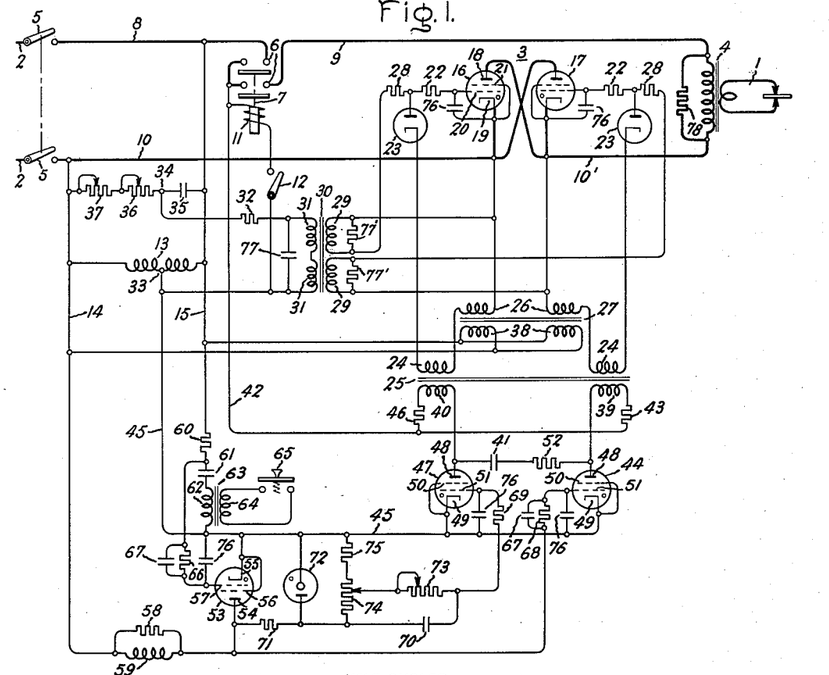
Fig. 1 of this drawing is a diagrammatic representation of my invention as applied to a resistance spot welding control system, and Fig. 2 thereof is a graphic representation of certain of the control voltages occurring in this system.

My invention will be better understood from a description of the particular embodiment thereof diagrammatically illustrated in Fig. 1 of the drawing.

As shown in this figure of the drawing, the load or welding circuit 1 is energized from a source of alternating current supply 2 through an electric translating system embodying electric valve means 3 and a welding transformer 4. The system is connected with the source of supply through manually operable switches 5, the contacts 6 of an electromagnetic switch 7, and conductors 8, 9, 10, and 10'. Switch 7 is also closed manually by the operator but once closed is maintained closed by the energization of its operating coil 11 which is connected in circuit with its upper contacts 6 and a manually operable switch 12 across the right-hand portion of an inductive winding 13 having its outside terminals connected through conductors 14 and 15 with the supply circuit 2 by way of conductors 8 and 10 and switches 5. When the voltage of the source decreases below a predetermined value the energization of the operating coil 11 of switch 7 will be insufficient to maintain its contacts 6 closed and consequently this switch functions as an undervoltage relay to disconnect the translating apparatus from the source of supply upon undervoltage or loss of voltage.

Undervoltage switch 7 serves primarily to protect the electric valves of the system. In order to simplify the drawing the primaries of the heating transformers for the cathodes of the electric valves have not been shown. They are connected across conductors 8 and 10 of the system and should switch 7 open its contacts, due to low or no voltage of the source, an appropriate interval of time should elapse after the voltage is restored before manually reclosing switch 7, so that the cathodes of the electric valves may be properly heated before the system is placed in operation.

Electric valve means 3 may comprise, as illustrated, a pair of electric power valves 16 and 17 which are reversely connected in parallel to supply alternating current from the supply circuit 2 to the welding transformer 4. These electric valves may be of any of the types well known in the art and, as illustrated, each comprises an anode 18, a cathode 19, a control member or grid 20 and a shield grid 21. The elements of each of the valves are enclosed in an envelope which preferably contains, as indicated by the dot, an ionizable medium, such as gas or vapor.

The shield grid 21 of each of these power valves is directly connected to its cathode. The control element or grid 20 of each of these power valves is connected with its cathode through a control element circuit which selectively and automatically impresses on the control element portions of a sine wave bias voltage or an adjustable phase sine wave control voltage in accordance with which is the more negative. Means are also connected in circuit with the bias voltage for rendering it ineffective for full half cycles of the voltage of the supply circuit so that the electric valves may be rendered conducting in response to the phase adjustable sine wave control voltage which determines the instant in each of the positive half cycles of anode voltage that the electric valves become conducting.

As illustrated in the drawing, the control element circuit for each valve branches into two parallel connected portions after passing through the current limiting resistor 22. One of the parallel portions includes in series with one another a unidirectional current conducting device 23, a secondary 24 of a transformer 25 and a secondary 26 of a transformer 27. The other parallel portion includes in series with one another a resistor 28 and a secondary 29 of a transformer 30. The unidirectional conducting device 23 polarizes the branch in which it is connected so that current may flow from the nonpolarized branch through resistor 28 thereof which will have a voltage drop corresponding to the difference in voltages of the secondary windings connected in these branch circuits when this resultant is in a direction to cause the unidirectional current conducting device to conduct. The unidirectional current conducting device selectively and automatically impresses on the control element of the electric valve with which it is associated, the voltage of that branch of the control element circuit which is more negative, that is, it applies the voltage of the secondary 26 of transformer 27 when that voltage is more negative than the voltage of the secondary 29 of transformer 30. As illustrated in the drawing, these unidirectional current conducting devices may be electric discharge devices of the vacuum type having their anodes connected toward the control elements 20 of electric valves 16 and 17 and between resistors 22 and 28 in the control element circuits of these valves.

The secondary windings 29 of transformer 30 impress on the control elements 20 of electric valves 16 and 17 sine wave voltages of the same frequency as the supply circuit and adjustable in phase relationship with regard to the anode-cathode voltages of electric valves 16 and 17. As will appear below, these adjustable sine wave voltages determine the instants in the half cycles of positive anode voltage that conduction is initiated by electric valves 16 and 17 and consequently the amount of current transmitted by these valves to the welding transformer and to the work to be welded in the load circuit 1.

This heat control is obtained by connecting the primary windings 31 of transformer 30 in series with one another and a resistor 32 across the output terminals 33 and 34 of a static phase shift network comprising inductive winding 13 connected in parallel with the series circuit through capacitor 35 and resistors 36 and 37 across conductors 14 and 15 which are energized by the supply circuit. Terminal 33 is a midtap of inductive winding 13 which may be the primary winding of a transformer having secondary windings connected to supply heating current to the cathode heaters of electric valves 16, 17 and 23. Terminal 34 is the common terminal of capacitor 35 and resistor 36. Both resistors 36 and 37 are adjustable. One resistor is adjusted for providing full heat, that is, adjusting the control voltage of windings 29 to render electric valves 16 and 17 conducting at the power factor phase angle of the load. The other resistor is used for decreasing the heat by causing the phase controlled voltage to fire electric valves 16 and 17 at an adjustable time later in the cycle than the power factor phase angle of the load current.

A capacitor 77 may be connected across the series connected primary windings 31 of transformer 30 to increase the impedance of this circuit and compensate for the exciting current supplied by the phase shift network to transformer 30. This prevents the normally semicircular locus of the control voltage vector from being pulled in toward its point of rotation determined by tap 33 of winding 13. Resistors 77' are also connected across the secondary windings 29 of transformer 30 to decrease, in the control element circuits of electric valves 16 and 17, the effects of transient voltages applied to the primary windings of transformer 30 and the effects of the inductances of these secondary windings on the control voltages of these control element circuits.

The secondaries 26 of transformer 27 impress in the control element circuits of electric valves 16 and 17 negative bias voltages of the same frequency as the supply circuit which is connected to the anode-cathode circuits of these electric valves. That is, the voltages of these secondaries are in phase opposition to the anode-cathode voltages of these valves. This bias voltage is obtained by connecting the primaries 38 of transformer 27 in parallel with one another across conductors 14 and 15 which are connected through conductors 10 and 8 and switches 5 with the supply circuit 2.

The negative bias voltage of windings 26 of transformer 27 is rendered ineffective by opposing thereto a turn-on voltage of substantially sine wave form which is of greater magnitude than this negative bias voltage. This turn-on voltage is provided by the secondaries 24 of a transformer 25 and is of the same frequency as that of the supply circuit. This turn-on voltage is obtained from an oscillating closed circuit including primary windings 39 and 40 of transformer 25 and a tuning capacitor 41.

Primary winding 39 of transformer 25 is connected across the right-hand portion of inductive winding 13 through conductor 15, upper contacts 6 of switch 7, conductor 42, current limiting resistor 43, electric valve 44 and conductor 45. Primary winding 40 of transformer 25 is connected in like manner through conductor 15, upper contacts 6 of switch 7, conductor 42, current limiting resistor 46, electric valve 47 and conductor 45. Electric valves 44 and 47 may be of any of the types well known in the art and, as illustrated, each comprises an anode 48, a cathode 49, a shield grid 50, and a control element or grid 51. The elements of each of these valves are enclosed in an envelope, which as indicated by the dot, preferably contains an ionizable medium, such as gas or vapor.

When electric valve 44 is conducting the primary windings 39 and 40 of transformer 25 are connected in series with one another for additive polarity, and when both electric valves 44 and 47 are conductive these primary windings are connected in parallel with one another for opposing polarity. When both electric valves 44 and 47 are conducting, windings 39 and 40 by opposing one another reduce the inductance of their circuits to a very low value and, consequently, at the time of such operation the current through these valves is limited primarily by the resistors 43 and 46 connected in circuit therewith. As will appear below, electric valve 44 is first rendered conductive and at a predetermined time later, electric valve 47 is also rendered conductive. As it is desired to have both of these electric valves conducting at the same time a resistor 52 connected in series circuit with capacitor 41 across the anodes 48 of electric valve 44 and 47 serves to prevent conduction of electric valve 47 from extinguishing electric valve 44 by impressing a negative voltage on its anode.

With the arrangement described, the oscillating circuit, including primary windings 39 and 40 of transformer 25 in closed circuit with capacitor 41, is set in oscillation and energized with half cycles of voltage so long as only electric valve 44 conducts. When both electric valves 44 and 47 are conducting simultaneously, capacitor 41 is short circuited and the primary windings 39 and 40 of transformer 25 are connected in parallel with one another for opposing polarity so that the circuit abruptly stops oscillating and no voltage is induced in the secondary windings 24 of transformer 25. Thus windings 24 impress in the control element circuits of electric valves 16 and 17 full cycles of alternating current which is substantially sinusoidal in shape, of the same frequency as the supply circuit and of greater magnitude than the sine wave bias voltage impressed in these control circuits by the secondaries 26 of transformer 27.

To obtain full cycles of alternating current in the oscillating circuit just described it is desirable to have electric valve 44 start conducting at the beginning of a half cycle of its positive anode voltage and to have electric valve 47 start conducting at the beginning of a half cycle of its positive anode voltage a predetermined adjustable time later. This is accomplished by making these valves conducting in trailing fashion in response to the conduction of an electric valve 53.

Electric valve 53 may be of any of the types well known in the art and, as illustrated, comprises an anode 54, a cathode 55, a shield grid 56, and a control element or grid 57. These elements are enclosed in an envelope which, as indicated by the dot, preferably contains an ionizable medium, such as a gas or vapor. The anode-cathode circuit of this valve is connected in series with an inductive load, represented by the parallel connected resistor 58 and inductance 59, across the left-hand portion of inductive winding 13 through conductors 45 and 14. By reason of their connection with the supply circuit through inductive winding 13, it will be noted that there is a direct connection between the cathodes of electric valves 44, 47, and 53 and that these cathodes are connected to the same potential of the alternating current supply circuit. Also it will be noted that the anodes of these electric valves are connected to potentials of the supply circuit through the agency of inductive winding 13 such that electric valve 53 may conduct during half cycles of voltage of one polarity and that electric valves 44 and 47 may conduct during half cycles of voltage of the opposite polarity. Since, as will be pointed out below, conduction of electric valves 44 and 47 is dependent on conduction of electric valve 53, this valve may be referred to as the leading valve and valves 44 and 47 as the trailing valves which become conducting during a negative half cycle of the voltage applied to valve 53.

The conductivity of electric valve 53 is controlled by a phase shift circuit having a resistor 60, a capacitor 61 and an inductor 62 connected in series with one another across the right-hand portion of inductive winding 13 through conductors 15 and 45. Inductor 62 is the primary winding of a transformer 63 having a secondary winding 64 electrically insulated therefrom. The secondary winding 64 of this transformer may be open circuited or short circuited by operation of a push button 65 which, as illustrated, is biased to the open circuit position. Short circuiting secondary winding 64 of transformer 63 substantially eliminates the inductive component across its primary winding 62 in the phase shift circuit including resistor 60, capacitor 61 and this primary winding 62.

The inductance of primary winding 62 of transformer 63, when its secondary winding 64 is open circuited, is substantially equal to the capacitance of capacitor 61. Consequently, with switch 65 open, the voltage across capacitor 61 and primary winding 62 of transformer 63 is in phase opposition to the anode-cathode voltage of electric valve 53 and when switch 65 is closed the voltage across capacitor 61 and primary winding 62 of transformer 63 is leading the anode-cathode voltage of electric valve by an amount slightly less than 180 degrees. These voltages are used to control the conductivity of electric valve 53 by connecting them in the control element circuit as shown in the drawing. This circuit includes impedance elements 62 and 61 of the phase shift circuit and the negative self-biasing means formed by the parallel connected resistor 66 and capacitor 67. Consequently, when switch 65 is open electric valve 53 is held nonconducting, and when switch 65 is closed electric valve 53 is rendered conducting at the beginning of a positive half cycle of its anode voltage.

The initiating transformer 63 provides a low voltage circuit that is insulated from the rest of the circuit and may be grounded. Avoiding the use thereby of an initiating relay makes a good quiet control which has merits for bench welders usually operated by girls. Furthermore the control is comparatively free from the effect of bouncing contacts since the weld initiating switch 65 must be closed during the beginning of a positive half cycle of anode voltage on electric valve 53 to cause this valve to conduct but the contacts may then reopen or bounce for almost a full cycle without effecting the operation of the control. Also the switch 65 is quicker in operation than an initiating relay which may require several cycles for its operation.

The conductivity of electric valve 44 is made dependent on the conductivity of electric valve 53 by connecting their cathodes together through conductor 45 and connecting the control element 51 of electric valve 44 to the anode connection of electric valve 53 with the inductive device 58, 59 and in circuit with the negative self-generated bias of the parallel connected capacitor 67 and resistor 68. By having the cathodes of these valves connected to the midtap 33 of inductive winding 13 and their anodes connected to opposite sides of the supply circuit in the manner described, electric valve 53 may conduct during a positive half cycle of its anode voltage and electric valve 44 may conduct in trailing fashion during the next half cycle of its positive anode voltage corresponding in time with the occurrence of the next negative half cycle of anode voltage of electric valve 53.

Electric valve 53 is a rectifier and passes current in one direction only, but due to its inductive load 58, 59 it continues to conduct over into the next negative half cycle of supply voltage for about 15 degrees thereof while part of the stored energy in the inductive load is fed back into the supply. Thus if switch 65 is closed to render electric valve 53 conducting, its anode voltage causes electric valve 44 to trail in conduction during the negative half cycles following the operation of electric valve 53. This operating control element voltage for electric valve 44 has a substantially rectangular wave form and is of practically constant magnitude as limited by the drop across the electric valve 53. The voltage drop is about 15 volts for gas valves of the type illustrated. This feature is of considerable importance for timing and sequencing operations such as performed by the control circuit. It will be noted that when electric valve 53 is nonconducting the voltage across it is in phase opposition to the anode-cathode voltage of electric valve 44 and that this voltage, applied in the control element circuit of electric valve 44, holds it nonconducting.

The conductivity of electric valve 47 is also made dependent on the conductivity of electric valve 53 by connecting their cathodes together through conductor 45 and by connecting the control element 51 of electric valve 47 to the anode connection of electric valve 53 through current limiting resistor 69, timing capacitor 70 and a resistor 71. During the time that electric valve 53 does not conduct, capacitor 70 is kept charged by the control element to cathode current of electric valve 47 which flows in response to the positive half cycles of anode voltage applied to electric valve 53. Therefore electric valve 47 does not conduct anode current not only because it has no trailing operating control element voltage furnished by the anode of electric valve 53 but also because of the negative control voltage furnished by the charge on capacitor 70. Furthermore, when electric valve 53 does conduct, electric valve 47 will not immediately conduct in trailing fashion because of the negative bias voltage imposed on its control element 51 by capacitor 70.

In the arrangement illustrated it will be noted that the voltage charge of capacitor 70 is depedent on the voltage across a voltage regulating valve 72. This valve is connected in series with its voltage absorbing resistor 71 across the anode and cathode terminals of electric valve 53. Valve 72 may be, as indicated, of the gaseous discharge type which when conducting maintains across its terminals a substantially constant voltage for different values of current flow therethrough. The particular valve employed is regulated to hold 105 volts across its terminals.

An adjustable discharger resistor 73 is connected across timing capacitor 70 through an adjustable potentiometer 74 connected in series with a resistor 75 across the terminals of the voltage regulating valve 72. Since a voltage also appears across voltage regulating valve 72 in its reverse direction, resistor 75 and potentiometer 74 operate to force the voltage of capacitor 70 down at an accelerated rate during the negative half cycles of anode voltage of electric valve 53. The arrangement is such that, electric valve 47 becomes conducting at the beginning of a positive half cycle of its anode voltage that occurs a full number of cycles later than the time that electric valve 44 starts conducting. Resistor 73 is a resistor tapped to provide one cycle timing increments and with the proper adjustment of potentiometer 74, the full number of cycles will be invariably the same. This insures timing of the main or power electric valves for conduction in full cycle steps. In each case electric valves 44 and 47 trail electric valve 53 in response to the trailing component of control element voltage from its anode 54 which results from its conducting over into its negative half cycle which corresponds to the positive half cycles of anode-cathode voltage for electric valves 44 and 47.

Capacitors 76 are connected across the control elements and cathodes of electric valves 16, 17, 44, 47 and 53 to render these valves resistant to faulty operation resulting from transient anode voltages applied thereto. A voltage limiting means 78 may also be connected across the primary winding of the welding transformer 4 to protect it from voltage surges. This means has been illustrated as a resistor and may be of the the type described and claimed in United States Letters Patent 1,822,742 Karl B. McEachron, September 8, 1931.

As previously stated, the drawing has been simplified by omitting the cathode heaters and cathode heating transformers for the several valves employed. Also as previously stated, winding 13 may be the primary of the heating transformer secondaries for electric valves 16, 17 and 23. The primary windings of other cathode heating transformers may be suitably connected, for example across conductors 14 and 15, as is the coil 13. It will be noted that by such an arrangement the cathode heating circuits of the several valves will be in operation as soon as switches 5 are closed. The welding circuit will, however, be inoperative until switch 7 is manually closed to complete the operating circuits of valves 16, 17, 44 and 47.

Figure 2:
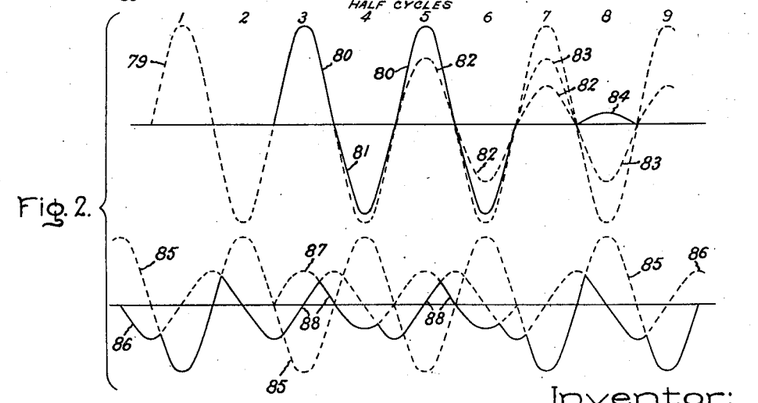

The features and advantages of my invention will be better understood from a consideration of the operation of the illustrated embodiment thereof, together with a consideration of certain control voltage relationships thereof illustrated in Fig. 2 of the drawing.

When switches 5 of the control circuit are closed the cathode heating circuits for the several valves will come into operation, and after a predetermined interval of time necessary to condition these electric valves for conduction, switch 7 may be closed to complete the several operating circuits of the system. Switch 7 will be maintained closed as long as the voltage of the supply circuit 2 is above a predetermined value, provided, of course, that switch 12 has also been closed. This switch 12 may be referred to as a safety switch or as a weld, no weld switch.

When switches 5 are closed the voltage of the alternating current supply circuit is applied through conductors 14 and 15 to the outside terminals of inductive winding 13. The anode-cathode circuit of electric valve 53 is connected across the left-hand portion of this winding between tap 33 thereof and its left outside terminal, whereas the anode-cathode circuits of electric valves 44 and 47 are connected across the right-hand portion of this winding between its right-hand outside terminal and its tap 33. Consequently, electric valve 53 has a positive anode-cathode voltage at the time electric valves 44 and 47 have a negative anode-cathode voltage, and vice versa.

As soon as switches 5 are closed capacitor 70 is charged through the control element to cathode circuit of electric valve 47 during those half cycles of voltage when the anode of electric valve 53 is positive. The voltage to which the capacitor is charged is determined by the voltage drop across the voltage regulator valve 72 across which the capacitor is connected through the control element to cathode circuit of electric valve 47. This capacitor will be charged up to its full control voltage within two or three cycles of the supply circuit voltage.

While this operation is taking place and the start or control switch 65 is open circuited, electric valve 53 is held nonconducting by the control voltage applied thereto which is in phase opposition to its anode-cathode voltage. As soon as switch 65 is closed, however, this control element voltage is retarded less than 180 degrees by reason of the removal from the phase shift circuit of the inductive value of transformer 63. The arrangement is such that the electric valve 53 may become conducting within the first 10 or 15 degrees of its positive anode-cathode voltage. For the purpose of this description all the electric valves are considered as having zero grid or control element characteristics although it is realized that in most cases they will have a slightly negative characteristic.

Conduction of electric valve 53 during its positive anode voltage causes electric valve 44 to trail in operation during the next negative half cycle which corresponds to a positive half cycle of voltage applied to electric valve 44. While electric valve 53 is conducting during a half cycle of its positive anode-cathode voltage, a negative half cycle of anode-cathode voltage is applied to electric valve 44. However, due to the inductive load 58, 59 connected in the anode-cathode circuit of electric valve 53, this valve conducts current over into the next negative half cycle of supply voltage for about 15 degrees thereof while the anode-cathode voltage of electric valve 44 is positive. It is this voltage drop across the anode-cathode of electric valve 53 which renders electric valve 44 conducting in trailing fashion. As previously pointed out, this control element voltage for electric valve 44 has a susbtantially rectangular wave form and is of practically constant magnitude as limited by the drop across electric valve 53 irrespective of voltage changes of the supply circuit 2. Although this same control voltage is impressed in the control element circuit of electric valve 47, this valve does not become conducting because of the negative bias voltage also applied in its control element circuit by the charge on capacitor 70.

Electric valve 44 when rendered conducting connects primary winding 39 of transformer 25 across the voltage of the right-hand portion of inductive winding 13. At the same time, by reason of an autotransformer connection, windings 39 and 40 of transformer 25 are connected in series with one another for additive polarity thus applying double anode voltage to electric timing valve 47 which renders more accurate its response to its control element voltage. These windings 39 and 40 are connected in a closed circuit with capacitor 41 and this circuit is set in oscillation at approximately the frequency of the supply circuit as soon as electric valve 44 becomes conducting.

A voltage of this oscillating circuit, impressed by the secondary windings 24 of transformer 25, applies a turn-on voltage in the excitation circuits of electric valves 16 and 17 causing these valves to conduct at the phase angle determined by the voltages also impressed in the control element circuits of these electric valves by the secondary windings 29 of transformer 30, as will be described in greater detail below. These electric valves 16 and 17 continue to conduct until electric valve 47 conducts after the time delay imposed by timing capacitor 70 connected in its excitation circuit. Thereupon with both electric valves 44 and 47 conducting, the condenser 41 of the oscillating circuit is shorted and the primary windings 39 and 40 of transformer 25 are connected in parallel with one another for opposing polarity. This abruptly halts oscillations of this circuit and causes the turn-on voltage of transformer 25 to disappear whereupon electric valves 16 and 17 are held nonconducting by the phase controlled voltage of transformer 30 or the bias voltage of transformer 27, whichever is more negative, under the control of switching valves 23, as will also be described in greater detail below. After condenser 70 has timed out and the welding time has been terminated by conduction of electric valve 47, another welding time may be again initiated by electric valve 44 upon opening switch 65 and again closing it to start the operation above described which was initiated by conduction of electric valve 53.

Referring now to the wave form sketch of Fig. 2, the sine wave voltage 79 thereof represents the anode supply voltage of the control electric valves 44 and 47 as well as the anode supply voltage of the power electric valve 16. Assuming that electric valve 53, which may be referred to as a keying valve, is initiated to start operation during the second half cycle of the control voltage 79, electric valve 44, which may be referred to as the turn-on valve, trails and operates during the third half cycle of voltage 79 and energizes the primary windings of transformer 25 from the supply circuit during this half cycle. Therefore, the third half cycle of voltage 79 may also be considered as showing the wave form 80 of the secondary voltages of transformer 25 during the first half cycle of operation of the oscillating circuit including primary windings 39 and 40 of transformer 25 and capacitor 41. The anode circuit of electric valve 44 is approximately resonant to the supply frequency and although electric valve 44 does not conduct during the fourth half cycle, transformer 25 delivers the second half cycle of turn-on voltage, as indicated by the solid line wave form 81 during the fourth half cycle. This second half cycle of turn-on voltage 81 has less amplitude than the first half cycle 80 but this is satisfactory, as will be observed when the manner in which the turn-on voltage is utilized is explained.

If electric valve 44 were not to conduct during the succeeding half cycles 5, 7 and 9, the oscillation of its anode circuit would soon become damped out and the secondary voltages from transformer 25 would decrease in amplitude, as indicated by wave form 82 which would have indefinite shut-off action. Wave form 82 would also probably get out of phase with the supply circuit voltage. However, for the two cycle timing operation illustrated in Fig. 2, electric valve 44 conducts during the fifth half cycle and connects the primaries of transformer 25 to the supply circuit, thus producing full secondary turn-on voltage 80 during the third half cycle of turn-on voltage instead of the voltage 82, which does not occur during the fifth half cycle or at any time following. Therefore, the turn-on voltage delivered by the secondaries of transformer 25 continue to have substantially sine wave form during the weld time. It might be expected that since eventually electric valve 44 must be caused to stop conducting the secondary voltage of transformer 25 would eventually die out with the decrement, as indicated by wave form 82 or 83. Such operation never occurs for reasons now to be explained.

At the end of the weld time interval shown as two cycles in Fig. 2, electric valve 47 which may be referred to as the turn-off or timing valve starts conducting during the seventh half cycle and continues to conduct along with electric valve 44. Therefore, the tuning capacitor 41 is, in effect, short circuited and the primary windings 39 and 40 of transformer 25 are now connected in parallel with one another with opposing polarity so that their ampere turns equal zero and the secondary voltages of the transformer 25 are reduced to zero without passing through any such oscillation as 82 or 83 as might have been expected. That is, although the turn-on voltage from transformer 25 is obtained from an oscillating circuit, it is abruptly stopped at the end of an even number of cycles of weld time, thus providing substantially sine wave turn-on voltages during the weld time in full cycle steps for all time adjustments. Note that during the second half cycle following the weld time there is a single very small half cycle of voltage, as shown by 84 in the wave form sketch. This impulse has a 180 degree phase relationship with the turn-on voltage and thus acts as a hold-off voltage not required but at the same time doing no harm. It is only of interest from the standpoint of circuit study. When the weld initiating switch 65 is released, electric valve 53 ceases conducting, electric valves 44 and 47 simultaneously cease conducting and transformer 25 remains deenergized until the next weld time is initiated.

Referring now to the control element circuits of the power electric valves 16 and 17, as well as to Fig. 2 of the drawing, it will be noted that the grid biasing voltage 85 of Fig. 2 obtained from the secondaries 26 of transformer 27 with one side at cathode potential is applied all the time, that is, during standby as well as during welding. Also it will be noted that a phase controlled sine wave voltage 86 of Fig. 2 from the secondaries 29 of transformer 30 with one side at cathode potential is also applied at the same time. During standby, that is, when no weld is being made, transformer 25 is deenergized and consequently the voltages of its secondary windings 24 are not opposed to the negative bias voltages of the secondary windings 26 of transformer 27. During this time the switching valves 23 cause the control elements 20 of electric valves 16 and 17 to be negative according to which of these control voltages is the more negative, the bias voltage from the secondary windings 26 of transformer 27 or the phase controlled voltages from the secondaries 29 of transformer 30, as shown by the solid line curve combining the more negative values of sine waves 85 and 86 during the first cycle of anode voltage 79 shown by dotted lines. Therefore, even without any self-rectified control element bias, the control elements of the power valves are held negative during the entire half cycles that their anodes are positive. When transformer 25 is energized by conduction of electric valve 44, the turn-on voltage 80 of Fig. 2 is applied to the control element circuits of eletric valves 16 and 17 in opposition to the bias voltage 85 of the secondary windings 26 of transformer 27. This turn-on voltage must equal or exceed the magnitude of the bias voltage. In Fig. 2 it is shown as exceeding the bias voltage 85 and when combined therewith produces a resultant voltage 87. Thereafter the control element voltage of power electric valves 16 and 17 will follow the control voltages in the parallel branches of the control circuits in accordance with which is the more negative voltage 86 or the resultant 87 of bias voltage 85 and turn-on voltage 80. As shown in Fig. 2, the resultant curve will be an irregular curve, shown by full lines and identified by reference numeral 88, until the turn-on voltage 80 of the primary windings 24 of transformer 25 again disappears and the control voltages return to the values occurring during the first half cycle of anode voltage 79 illustrated in Fig. 2.

It will be noted that by employing the arrangement of my circuit heat control is obtained by using only sine wave control voltages. In certain arrangements heretofore proposed the control element circuit of an electric valve has required an alternating current bias voltage, a self-rectified bias voltage and a peaked voltage for phase control, the alternating current bias voltage being sufficient to prevent the peaked component of voltage from being effective unless the alternating current bias is decreased by an additional component of sine wave turn-on voltage that occurs during the weld time. A sine wave voltage for phase control of the firing valves or the power valves of a control circuit has very definite merits in the control of resistance welding, especially flash welding, and when automatic regulating controls are applied. In accordance with my arrangement above described, the difficulties of substituting a sine wave phase control voltage for the peaked voltage heretofore employed has been readily solved so that no longer is it necessary to use peaking transformers in order to obtain the heat control desired.

It is, of course, apparent that my invention may be variously modified without departing from the spirit and scope of the teachings thereof. Thus, for example, the negative bias voltage furnished by the secondary windings 26 of transformer 27 may be replaced by a direct current bias voltage which is rendered effective or ineffective by any suitable switching means and in accordance with a time controlled pattern. Furthermore it is only necessary for this negative bias voltage and the turn on voltage to be effective at a time that the phase controlled voltage from a source such as transformer 30 becomes positive. Likewise it is not necessary for electric valve 53 to become conducting at the beginning of a positive half cycle of its anode voltage although for accuracy of timing it should become conducting synchronously, that is, at the same times in half cycles of its anode voltage. Furthermore resistors 74 and 75 could be omitted although their presence is a distinct advantage.

It is likewise apparent that other cathode protective arrangements for the electric valves may be substituted for the operator actuated electromagnetic switch 7. It is also apparent that only one of the electric valves 16 and 17 will be needed when performing half cycle welding operations. Furthermore, instead of the cathode heated type of electric valves illustrated for 16 and 17, it is apparent that other forms of electric valves may be used. Thus, for example, the electric valves 16 and 17 may become the control or firing valves for ignitrons having anodes, cathodes and control elements in which the cathodes are pools of mercury and the control elements are igniters of high resistance material immersed in the cathode pools. In such case the anode-cathode circuits of electric valves 16 and 17 would usually be connected in series with current limiting resistors between the igniter and the anode of each ignitron. Other arrangements, of course, will occur to those skilled in the art when using electric valves other than the thyratron or ignitron types specifically referred to above without in any respect departing from my invention as embodied in the system above described.

It is also apparent that although I have heretofore referred to the welding circuit or load circuit as being that portion of the circuit connecting the secondary of the welding transformer 4 to the welding electrodes, this load circuit may be as readily conceived of as being that portion thereof including the welding transformer as well as the connection of its secondary winding to the welding electrodes.

Therefore while I have shown and described a particular embodiment of my invention, it will be obvious to those skilled in the art that the above changes, as well as others, may be made without departing from my invention in its broader aspects, and I therefore aim in the appended claims to cover all such changes and modifications as fall within the true spirit and scope of my invention.

What I claim as new and desire to secure by Letters Patent of the United States is:

1. Apparatus comprising an alternating current supply circuit, an electric valve connected to be energized from said supply circuit and having an anode, a cathode and a control element, a control element circuit for applying a negative bias voltage and an adjustable phase sine wave control voltage to said control element, means interposed in circuit with said control element for selectively and automatically impressing upon said control element that one of said bias and control voltages which is more negative, and means for introducing in said control element circuit, in opposition to said bias voltage, a turn-on voltage which is substantially sinusoidal in form, of substantially the frequency of the voltage of said supply circuit, and of sufficient magnitude to produce with said bias voltage a resultant voltage which is more positive than said control voltage at and for a substantial time before and after said control voltage attains a value sufficient to render said electric valve conducting and thus initiates conduction of said electric valve by said last-mentioned means in accordance with the phase adjustment of said control voltage.

2. Apparatus comprising an alternating current supply circuit, an electric valve connected to be energized from said supply circuit and having an anode, a cathode and a control element, a control element circuit for applying a negative bias voltage and an adjustable phase sine wave control voltage to said control element, means interposed in circuit with said control element for selectively and automatically impressing upon said control element that one of said bias and control voltages which is more negative, and means for introducing in said control element circuit, in opposition to said bias voltage, a predetermined number of cycles of a turn-on voltage which is substantially sinusoidal in form, of substantially the frequency of the voltage of said supply circuit, and of sufficient magnitude to produce with said bias voltage a resultant voltage which is more positive than said control voltage at and for a substantial time before and after said control voltage attains a value sufficient to render said electric valve conducting and thus initiates conduction of said electric valve by said last-mentioned means in accordance with the phase adjustment of said control voltage.

3. Apparatus comprising an alternating current supply circuit, an electric valve connected to be energized from said circuit and having an anode, a cathode and control element, a circuit for applying to the control element of said electric valve a sine wave voltage of the same frequency as the voltage of said supply circuit and adjustable in phase relative to the anode-cathode voltage of said valve and a second sine wave voltage of the same frequency as the voltage of said supply circuit and of a value sufficient to maintain said valve non-conducting when said phase controlled sine wave voltage has a value sufficient to render said valve conducting, means interposed in circuit with said control element for selectively and automatically impressing upon said control element that one of said sine wave voltages which is more negative, and means in circuit with said second sine wave voltage for applying in phase opposition thereto during a predetermined number of half cycles of alternating current of said supply circuit a third alternating voltage of substantially sine wave form, of the same frequency and of greater magnitude than said second sine wave voltage.

4. Apparatus comprising an alternating current supply circuit, an electric valve connected to be energized from said circuit and having an anode, a cathode and a control element, a circuit for applying to the control element of said electric valve a sine wave voltage of the same frequency as the voltage of said supply circuit and adjustable in phase relative to the anode-cathode voltage of said valve and a second sine wave voltage of the same frequency as said supply circuit and of a value sufficient to maintain said valve non-conducting when said phase control sine wave voltage has a value sufficient to render said valve conducting, means interposed in circuit with said control element for selectively and automatically impressing upon said control element that one of said sine wave voltages which is more negative, and means for supplying in phase opposition to said second sine wave voltage an alternating voltage which is substantially sinusoidal in shape, of substantially the same frequency as the voltage of said supply circuit, and of greater magnitude than of said bias voltage during a predetermined number of half cycles of said alternating current of said supply circuit for the time interval in each of said half cycles in which a positive anode voltage is applied to said valve by said alternating current supply circuit and said adjustable phase sine wave voltage has attained a value sufficient to render said electric valve conducting.

5. Apparatus comprising an alternating current supply circuit, an electric valve having a control element and having its anode-cathode circuit connected to be energized from said supply circuit, two parallel connected excitation circuits for said electric valve only one of which is polarized and includes a unidirectional current conducting device having one terminal connected to said control element of said electric valve and its other terminal connected in series circuit with a source of negative sine wave bias voltage to the cathode of said electric valve and the other of which includes a source of control voltage having one terminal connected to the cathode of said electric valve and its other terminal connected in series with a resistance element to said one terminal of said unidirectional current conducting device, said unidirectional current conducting device of said polarized excitating circuit being poled to conduct current from said non-polarized excitation circuit through said resistance element thereof, and means for applying in said one excitation circuit, in phase opposition to said sine wave bias voltage, a turn-on voltage which is substantially sinusoidal in shape, of substantially the same frequency as said bias voltage, and of a magnitude greater than said bias voltage during a predetermined number of half cycles of said alternating current of said supply circuit for a time interval in each of said half cycles in which a positive anode voltage is applied to said valve by said alternating current source and said source of control voltage has attained a value sufficient to render said electric valve conducting.

6. Apparatus comprising an alternating current supply circuit, a load circuit, electric translating apparatus interconnecting said circuits and including an electric valve means having an anode, a cathode and a control member, means energized from said supply circuit and connected in the control member circuit of said electric valve means for applying to said control member a sine wave voltage of the same frequency as the voltage of said supply circuit and adjustable in phase relative to the anode-cathode voltage of said valve means and a second sine wave voltage of the same frequency as the voltage of said supply circuit and of a value sufficient to maintain said valve means non-conducting when said phase controlled sine wave voltage has a value sufficient to render said valve means conducting, means including a resistor and a unidirectional current conducting device connected in series with one another between said sine wave voltages in said control member circuit and having a common connection with said control member relatively to which said unidirectional current conducting device is poled for selectively and automatically impressing upon said control member that one of said sine wave voltages in said control member circuit which is more negative, a control transformer having two primary windings and a secondary winding, a capacitor connected in closed circuit with said primary windings of said control transformer to form an oscillating circuit resonant to the frequency of said supply circuit, said primary windings of said control transformer being arranged relatively to one another in said oscillating circuit so that energization of one of said primary windings sets said circuit in oscillation and energization of both of said primary windings abruptly halts the oscillations of said oscillating circuit, means connecting the secondary of said control transformer in said control member circuit for impressing in circuit with said second sine wave voltage and in phase opposition thereto an alternating current of the same frequency and of greater magnitude than said second sine wave voltage, an electric valve having an anode, a cathode, and a control element, means including a circuit connected across said supply circuit and including one of the primary windings of said control transformer and the anode-cathode circuit of said electric valve for energizing said oscillating circuit from said supply circuit during half cycles of the voltage of said supply circuit for which said electric valve is conducting, a second electric valve having an anode, a cathode, and a control element, means including a circuit connected across said supply circuit and including the other of the primary windings of said control transformer and the anode-cathode circuit of said second electric valve for abruptly halting the oscillations of said oscillating circuit when said first and said second electric valves are both rendered conducting, and means connected in the control element circuits of said electric valves for rendering said first electric valve conducting at the beginning of a positive half cycle of its anode voltage and after a predetermined number of half cycles of conduction of said first electric valve for rendering both of said electric valves conducting.

7. Apparatus comprising an alternating current supply circuit, a load circuit, electric translating apparatus interconnecting said circuits and including an electric valve means having an anode, a cathode and a control member, means energized from said supply circuit and connected in the control member circuit of said electric valve means for applying to said control member a sine wave voltage of the same frequency as the voltage of said supply circuit and adjustable in phase relative to the anode-cathode voltage of said valve means and a second sine wave voltage of the same frequency as the voltage of said supply circuit and of a value sufficient to maintain said valve means non-conducting when said phase controlled sine wave voltage has a value sufficient to render said valve means conducting, means including a resistor and a unidirectional current conducting device connected in series with one another between said sine wave voltages in said control member circuit and having a common connection with said control member relative to which said unidirectional current conducting device is poled for selectively and automatically impressing upon said control member that one of said sine wave voltages in said control member circuit which is more negative, a control transformer having two primary windings and a secondary winding, a capacitor connected in closed circuit with said primary windings of said control transformer to form an oscillating circuit resonant to the frequency of said supply circuit, said primary windings of said control transformer being arranged relative to one another in said oscillating circuit so that energization of one of said primary windings sets said circuit in oscillation and energization of both of said primary windings abruptly halts the oscillations of said oscillating circuit, means connecting the secondary of said control transformer in said control member circuit for impressing in circuit with said second sine wave voltage and in phase opposition thereto an alternating current of the same frequency and of greater magnitude than said second sine wave voltage, first, second and third electric valves each having an anode, a cathode and a control element, a direct connection between the cathodes of said electric valves, means for connecting the anode-cathode circuit of said third electric valve in an inductive circuit with said supply circuit for conduction during half cycles of voltage thereof of one polarity and for connecting the anode-cathode circuits of said first and second electric valves with said supply circuit for conduction during half cycles of voltage thereof of the other polarity and with the anode-cathode circuit of said first electric valve in series with one of the primary windings of said control transformer for starting oscillations in said oscillating circuit during conduction of said first electric valve and with the anode-cathode circuit of said second electric valve in series with the other of the primary windings of said control transformer for abruptly halting oscillations in said oscillating circuit during conduction of both said first and second electric valves, means connecting the control element of said first electric valve to the anode of said third electric valve for rendering said first electric valve conducting in response to the voltage drop across said third electric valve and in trailing fashion dependent on conduction of said third electric valve, means including a timing capacitor connected in the control element circuit of said second electric valve for connecting the control element of said second electric valve to the anode of said third electric valve, adjustable means connected across said capacitor for controlling the discharge of said capacitor, means for charging said capacitor through the control element to cathode circuit of said second electric valve in response to the voltage applied to the anode-cathode circuit of said third electric valve, and means synchronized with the voltage of said supply circuit for applying in the control element circuit of said third electric valve a voltage rendering said third electric valve conducting at the beginning of positive half cycles of its anode voltage.

8. Apparatus comprising an alternating current supply circuit, a load circuit, electric translating apparatus interconnecting said circuits and including an electric valve means having a control member, two electric valves each of which has an anode, a cathode, and a control element, means including said electric valves for impressing in the control member circuit of said electric valve means a voltage controlling the conductivity of said electric valve means, said means including an oscillating circuit having two windings the energization of one of which through the anode-cathode circuit of one of said electric valves from said supply circuit during half cycles of the voltage of said supply circuit for which said first electric valve is conducting sets said oscillating circuit in oscillation and the energization of the other of which through the anode-cathode of the other of said electric valves from said supply circuit abruptly halts the oscillations of said oscillating circuit when both electric valves are rendered conducting, and means for impressing control voltages in the control element circuits of said electric valves for rendering one of said electric valves conducting and a predetermined time thereafter for rendering the other of said electric valves conducting.

9. Apparatus comprising an alternating current supply circuit, a load circuit, electric translating apparatus interconnecting said circuits and including an electric valve means having a control member, a control transformer having two primary windings and a secondary winding, said secondary winding being connected in the control member circuit of said electric valve means for controlling the conductivity of said electric valve means, first and second electric valves each having an anode, a cathode, a control element, means including the anode-cathode circuit of said first electric valve for connecting said primary windings of said control transformer for energization from said supply circuit with said windings connected in series with one another for additive polarity, means including the anode-cathode circuits of said first and second electric valves for connecting said primary windings of said control transformer for energization from said supply circuit with said windings connected in parallel with one another for opposing polarity, means in circuit with each of said primary windings for limiting the current supplied therethrough and through said electric valves from said supply circuit, a capacitor connected in a closed circuit with said primary windings for producing an oscillating circuit when said closed circuit is energized from said supply circuit by said first electric valve, said primary windings and said capacitor being effectively short circuited when both of said electric valves are rendered simultaneously conducting, means including a resistor connected in circuit with said capacitor and said electric valves for maintaining the conduction of said first electric valve when said second electric valve becomes conducting, and means for impressing control voltages in the control element circuits of said electric valves for controlling the conductivities of said electric valves.

10. Apparatus comprising an alternating current supply circuit, a load circuit, electric translating apparatus interconnecting said circuits and including an electric valve means having a control member, a control transformer having two primary windings and a secondary winding, said secondary winding being connected in the control member circuit of said electric valve means for supplying a voltage controlling the conductivity of said electric valve means, one terminal of each of said primary windings being connected through a current limiting resistor to one side of said supply circuit and the other terminals of said primary windings being connected across a capacitor and a commutation suppressing resistor to form a closed oscillating circuit, means for initiating and abruptly stopping oscillations in said oscillating circuit, said means including a pair of electric valves having anodes, cathodes and control elements and having their anode-cathode circuits respectively connected in parallel relationship between said other terminals of said primary windings and the other side of said supply circuit, the arrangement being such that conduction of one of said electric valves initiates oscillations in said oscillating circuit by connecting said primary windings across said supply circuit in series with one another for additive polarity and such that conduction of both of said electric valves short circuits said capacitor through said commutation suppressing resistor and abruptly halts oscillations in said oscillating circuit by connecting said primary windings in parallel with one another with opposing polarities, and means for impressing control voltages in the control element circuits of said electric valves for controlling the conductivities of said electric valves.

11. Apparatus comprising an alternating current supply circuit, a load circuit, electric translating apparatus interconnecting said circuits and including an electric valve means having a control member, a control transformer having two primary windings and a secondary winding, said secondary winding being connected in the control member circuit of said electric valve means for supplying a voltage controlling the conductivity of said electric valve means, first and second electric valve means each having an anode, a cathode, and a control element, means including the anode-cathode circuit of said first electric valve for connecting said primary windings of said control transformer for energization from said supply circuit with said windings connected in series with one another for additive polarity, means including the anode-cathode circuits of both of said electric valves for connecting said primary windings of said control transformer for energization from said supply circuit with said windings connected in parallel with one another for opposing polarity, means in circuit with each of said primary windings for limiting the current supplied therethrough and through said electric valves from said supply circuit, a capacitor connected in a closed circuit with said primary windings for producing an oscillating circuit when said closed circuit is energized by said first electric valve, said primary windings and said capacitor being effectively short circuited when both of said electric valves are rendered simultaneously conducting, means including a resistor connected in circuit with said capacitor and said electric valves for maintaining the conduction of said first electric valve when said second electric valve becomes conducting, and means for impressing control voltages in the control element circuits of said electric valves for rendering said first valve conducting during half cycles of said alternating current supply circuit for which said electric valve is connected to conduct and after a predetermined number of half cycles of conduction of said first electric valve for rendering both of said electric valves conducting.

12. Apparatus comprising an alternating current supply circuit, a load circuit, electric translating apparatus interconnecting said circuits and including an electric valve means having a control member, a control transformer having two primary windings and a secondary winding, said secondary winding being connected in the control member circuit of said electric valve means for supplying a voltage controlling the conductivity of said electric valve means, first and second electric valves each having an anode, a cathode, and a control element, means including the anode-cathode circuit of said first electric valve for connecting said primary windings of said control transformer for energization from said supply circuit with said windings connected in series with one another for additive polarity, means including the anode-cathode circuits of both of said electric valves for connecting said primary windings of said control transformer for energization from said supply circuit with said windings connected in parallel with one another for opposing polarity, means in circuit with each of said primary windings for limiting the current supplied therethrough and through said electric valves from said supply circuit, a capacitor connected in a closed circuit with said primary windings for producing an oscillating circuit when said closed circuit is energized by said first electric valve, said primary windings and said capacitor being effectively short circuited when both of said electric valves are rendered simultaneously conducting, means including a resistor connected in circuit with said capacitor and said electric valves for maintaining the conduction of said first electric valve when said second electric valve becomes conducting, means for impressing in the control element circuit of said first electric valve a control voltage which renders said first electric valve conducting at the beginning of a positive half cycle of its anode-cathode voltage, and means for impressing in the control element circuit of said second electric valve a control voltage which renders said second electric valve conducting at the beginning of a positive half cycle of its anode-cathode voltage which occurs a predetermined number of cycles after said first mentioned electric valve has been rendered conducting.

13. Apparatus comprising two electric valves each of which has an anode, a cathode and a control element, a direct connection between the cathodes of said electric valves, means for supplying to the anode-cathode circuits of said electric valves alternating voltages which are in phase opposition so that one of said electric valves may conduct during half cycles of voltage of one polarity and the other of said electric valves may conduct during half cycles of voltage of the opposite polarity, said means providing an inductive circuit through the anode-cathode circuit of said one of said electric valves, means for introducing into the control element circuit of said one of said electric valves voltages rendering said one of said electric valves conducting and non-conducting when its anode voltage is positive, and means for connecting the control element of the other of said electric valves to the anode connection of said one of said electric valves in its said inductive circuit.

14. Apparatus comprising an alternating current supply circuit, two electric valves each of which has an anode, a cathode and a control element, means connecting the cathodes of said electric valves to a common terminal of said alternating current supply circuit and the anodes of said electric valves to terminals of said alternating current supply circuit having voltages which are in phase opposition relative to the voltage of said common terminal so that one of said electric valves may conduct during half cycles of voltage of one polarity and the other of said electric valves may conduct during half cycles of voltage of the opposite polarity, said means providing an inductive circuit through the anode-cathode circuit of one of said electric valves, means for introducing into the control element circuit of said one of said electric valves voltages rendering said one of said electric valves conducting and non-conducting when its anode voltage is positive, and means connecting the control element circuit of the other of said electric valves with said inductive circuit for introducing into said control element circuit only that voltage of said inductive circuit which appears across the anode and cathode of said one of said electric valves.

15. Apparatus comprising an alternating current supply circuit, two electric valves each of which has an anode, a cathode and a control element, means connecting the cathodes of said electric valves to a common terminal of said alternating current supply circuit and the anodes of said electric valves to terminals of said alternating current supply voltage having voltages which are in phase opposition relative to the voltage of said common terminal so that one of said electric valves may conduct during half cycles of voltage of one polarity and the other of said electric valves may conduct during half cycles of voltage of the opposite polarity, said means providing an inductive circuit through the anode-cathode circuit of one of said electric valves, means for introducing into the control element circuit of said one of said electric valves voltages rendering said one of said electric valves conducting and non-conducting when its anode voltage is positive, and means connecting the anode-cathode circuit of said one of said electric valves in the control element circuit of said other of said electric valves for rendering said other of said electric valves non-conducting by applying to its control element a voltage in phase opposition to its anode-cathode voltage when said one electric valve is non-conducting and for rendering said other of said electric valves conducting in response to the voltage drop across said one of said electric valves when said one of said electric valves is conducting and the anode voltage of said other of said electric valves is positive.

16. Apparatus comprising an alternating current supply circuit, a voltage divider connected for energization from said supply circuit and having outside terminals and a tap intermediate said outside terminals, two electric valves each having an anode, a cathode and a control element, means for connecting the cathodes of said valves to said intermediate tap of said voltage divider, the anode of one of said valves through an inductive circuit to one of said outside terminals of said voltage divider and the anode of the other of said valves through another circuit to the other of said outside terminals of said voltage divider, means for introducing into the control element circuit of said one electric valve voltages rendering said one electric valve conducting and non-conducting when its anode voltage is positive, and means connecting the control element circuit of said other electric valve with said inductive circuit for introducing into said control element circuit only that voltage of said inductive circuit which appears across the anode and cathode of said one electric valve.

17. Apparatus comprising an alternating current supply circuit, a load circuit, electric translating apparatus interconnecting said circuits and including an electric valve means having a control member, means including a first electric valve which when conductive applies to the control member of said electric valve means a component of voltage rendering said valve means conductive, said electric valve having an anode, a cathode, and a control element, means including a second electric valve which when conductive supplies to the control member of said electric valve means a component of voltage rendering said electric valve means non-conductive, said electric valve having an anode, a cathode, and a control element, a third electric valve having an anode, a cathode, and a control element, a direct connection between the cathodes of said first, second and third electric valves, means for connecting the anode-cathode circuits of said first and second electric valves and the anode-cathode circuit of said third electric valve respectively with voltages of said supply circuit which are in phase opposition so that said first and second electric valves may conduct during half cycles of voltage of one polarity and said third electric valve may conduct during half cycles of voltage of the opposite polarity, said means providing an inductive circuit through the anode-cathode circuit of said third electric valve, means connecting the control element of said first electric valve to the anode connection of said third electric valve in its said inductive circuit for rendering said first electric valve conductive in response to the voltage drop across said third electric valve and in trailing fashion dependent on conduction of said third electric valve, means including a timing capacitor for connecting the control element of said second electric valve to the anode connection of said third electric valve in its said inductive circuit, adjustable means connected across said capacitor for controlling the discharge of said capacitor, means for charging said capacitor through the control element to cathode circuit of said second electric valve in response to the voltage applied to the anode-cathode circuit of said third electric valve, and means synchronized with the voltage of said supply circuit for applying in the control element circuit of said third electric valve a voltage rendering said third electric valve conducting at the beginning of half cycles of its positive anode voltage.

18. Apparatus comprising an alternating current supply circuit, an electric valve having an anode, a cathode and a control element, means for connecting the anode-cathode circuit of said electric valve for energization from said supply circuit, a transformer having primary and secondary windings, means including a switch for short circuiting turns of said secondary winding of said transformer and thereby altering the inductance of its said primary winding, a control voltage circuit connected for energization from said supply circuit and including a resistor, a capacitor and the primary winding of said transformer connected in series with one another and grouped relative to one another and to two terminals of said control voltage circuit so that said capacitor and the primary winding of said transformer are located between said terminals and said resistor is located external thereto, and continuously conductive circuits respectively connecting the control element and the cathode of said electric valve with said terminals of said control voltage circuit.

19. Apparatus comprising an alternating current supply circuit, an electric valve having an anode, a cathode and a control element, means for connecting the anode-cathode circuit of said electric valve for energization from said supply circuit, a control voltage circuit connected for energization from said alternating current supply circuit and comprising a plurality of impedance elements connected in circuit with one another independently of said electric valve for energization from said supply circuit, means for short circuiting a portion of said control voltage circuit, and means connecting the control element to cathode circuit of said electric valve across that portion of said control voltage circuit having voltages of different phase relationships with respect to the anode-cathode voltage of said electric valve, depending upon the operation of said last mentioned means.

20. Apparatus comprising an alternating current supply circuit, an electric valve having an anode, a cathode and a control element, means for connecting the anode-cathode circuit of said electric valve for energization from said supply circuit, a resistor, a capacitor, a transformer having a primary winding and a secondary winding electrically insulated therefrom, the inductance of said primary winding being substantially equal to the capacitance of said capacitor when said secondary winding is open circuited, means for short circuiting the secondary winding of said transformer, and means for connecting said capacitor and said primary winding of said transformer in series with one another in the cathode to control element circuit of said electric valve and as a unit in series with said resistor for energization from said supply circuit, said connection producing across said capacitor and said primary winding of said transformer when said secondary winding of said transformer is open circuited, a voltage in phase opposition to the anode-cathode voltage of said valve, and when said secondary winding of said transformer is short circuited, a voltage that causes said electric valve to conduct at the beginning of a positive half cycle of its anode voltage.

MAURICE E. BIVENS.

REFERENCES CITED

The following references are of record in the file of this patent:

UNITED STATES PATENTS

| Number | Name | Date |
| --- | --- | --- |
| 1,938,742 | Demarest | Dec. 12, 1933 |
| 2,057,585 | Palmer | Oct. 13, 1936 |
| 2,253,129 | Lord | Aug. 19, 1941 |
| 2,298,210 | Gulliksen | Oct. 6, 1942 |
| 2,370,287 | Bivens | Feb. 27, 1945 |
| 2,404,643 | Livingston | July 23, 1946 |